United States Patent [19]
Tsai et al.

[11] Patent Number: 5,920,392
[45] Date of Patent: Jul. 6, 1999

[54] ENVIRONMENTAL PARAMETER MEASUREMENT DEVICE AND METHOD FOR LASER INTERFEROMETRY

[75] Inventors: John C. Tsai, Saratoga; Mervyn I. Hopson, Cupertino, both of Calif.

[73] Assignee: Excel Precision, Inc., Santa Clara, Calif.

[21] Appl. No.: 08/996,554

[22] Filed: Dec. 22, 1997

Related U.S. Application Data

[63] Continuation-in-part of application No. 08/587,933, Jan. 17, 1996, abandoned.

[51] Int. Cl.$^6$ ........................................... G01B 9/02
[52] U.S. Cl. ............................................ 356/358; 356/361
[58] Field of Search .................................. 356/358, 363, 356/361, 345, 357

[56] References Cited

U.S. PATENT DOCUMENTS 4,643,577  2/1987  Roth et al. ............................... 356/358

OTHER PUBLICATIONS

N. Bobroff, "Recent advances in displacement measuring interferometry," Meas. Sci. Technol. 4 (1993), pp. 907–926.

W.T. Estler, "High–accuracy displacement interferometry in air," Applied Optics vol. 24, No. 6 (Mar. 15, 1985), pp. 808–815.

P. Schellekens et al., "Design and Results of a New Interference Refractometer Based on . . . Laserinterferometer," Annals of the CIRP vol. 35 (1986), pp. 387–391.

*Primary Examiner*—Samuel A. Turner
*Attorney, Agent, or Firm*—Raymond E. Roberts; Michael J. Hughes

[57] ABSTRACT

An environmental metrology device (10) containing sensor (12) elements which include a pressure sensor (20), a temperature sensor (22), and a humidity sensor (24) all located in close proximity within a housing (18). Control circuitry (16) is further provided to direct operation of the sensors (12) and to communicate with an interferometer controller (42) via a signal port (14) and a cable (92). Additional instances of the device (10) may be connected in a daisy-chain network configuration via additional signal ports (14) and cables (90). One or more instances of the device (10) permit highly localized characterization of atmospheric index of refraction in the measurement region (60) of a laser interferometer (30). The interferometer controller (42) is thereby able to compensate measurements performed by the laser interferometer (30) before they are passed onto manufacturing process controls (48).

15 Claims, 3 Drawing Sheets

ENVIRONMENTAL PARAMETER MEASUREMENT DEVICE AND METHOD FOR LASER INTERFEROMETRY

CROSS-REFERENCE TO RELATED APPLICATIONS

This application is a continuation-in-part of U.S. application Ser. No. 08/587,933, filed on Jan. 17, 1996 now abandoned, by the present inventors, and also titled "Environmental Parameter Measurement Device And Method For Laser Interferometry."

TECHNICAL FIELD

The present invention relates generally to atmospheric metrology used in manufacturing environments, and more particularly to environmental monitoring techniques used to enhance laser interferometric measurements. The inventors anticipate that primary application of the present invention will be displacement measurement in industries that require highly precise measurements. Examples of such industries include semiconductor fabrication, manufacturing of flat-panel displays, and manufacturing of computer disk storage (both magnetic and optical). However, the present invention is also well suited to use in any small localized environment where atmospheric metrology is a concern, and while displacement interferometry is paramount in the following discussion, the invention also has obvious application in at least wavelength interferometry and refractometry.

BACKGROUND ART

Today, miniaturization has greatly increased the capabilities of many products, largely due to increased accuracy in the measurement techniques used during manufacturing. Similarly, reliability of many products has been increased, largely through increased repeatability of such accuracy in such measurements. Further, it has come to be generally accepted that even further increases in measurement accuracy and measurement repeatability are ways to even further increase the capacity and reliability of manufactured products.

One of the most accurate techniques used for measuring is interferometry. Interferometers operate by emitting radiation; splitting it into reference and measurement beams; permitting the reference beam to encounter a fixed set of conditions; permitting the measurement beam to encounter a variable condition; recombining the reference and measurement beams; and then studying the radiation wave interference effect that results to determine the extent to which the variable condition has actually varied.

In the basic interferometer three factors are variable: the wavelength of the radiation, the speed at which it travels, and the distance which it travels. To perform interferometric measurement two of these factors are held constant while the third is permitted to vary. Such variation produces corresponding change in the interference effect, which is measurable, thus making it possible to calculate the amount which the variable factor has actually varied. The accuracy and repeatability of measurements made in this manner are determined by the resolution of the instrumentation used, how well the constant factors are controlled and actually held constant, and how well any variation in the constant factors is later compensated for.

From the preceding it follows that three general types of interferometric measurement are possible: radiation wavelength measurement, radiation speed measurement (termed refractometry when light is used as the radiation), and distance measurement change (i.e., displacement). For displacement interferometry (e.g., for making physical measurements in manufacturing scenarios, which are the primary concern here) the wavelength and speed of the radiation are held constant, while the displacement of a target is permitted to vary and affect the measurable interference effect. To provide constant wavelength radiation today the overwhelming choice of radiation source is the laser. Lasers can provide light having suitable coherence (i.e., predominantly single wavelength, or at least quite discrete wavelengths), as well as light having known and repeatable wavelength. The speed of radiation is determined by the characteristics of the regions through which it travels. In a vacuum all electromagnetic radiation travels at the speed of light. But, through different materials radiation travels at slower speeds. For interferometers using laser radiation (i.e., light) such materials typically are glass optical elements and air or other gas mixtures. Finally, in the context of light radiation, the common terminology used to discuss the speed of light in such materials is "index of refraction," the ratio of the speed of light in a vacuum to its actual speed in the specific material. All further discussion of radiation speed here will use the term index of refraction.

Returning now to interference, it is the well understood combination effect when multiple waves intersect. Wave interference produces fringe patterns, and as characteristics of the waves change the fringe patterns produced also change. For purposes of displacement interferometry the intended variable wave characteristic is the change in the distance which the radiation waves travel (i.e., the displacement). The mathematical relationship of such change is that one full cycle of fringe change occurs for each path length change of one-half radiation wavelength.

Suitable sensors, such as high-speed photo diodes, can be used to detect the changing intensity of fringes falling upon them. In displacement interferometry this is exploited in two manners. For coarse measurements, the changing fringe cycles may be counted as they pass a sensor. For fine measurements, the phase of particular fringe cycles may be detected (with $\lambda/64$ resolution common in instrumentation used today). In theory, using 633 nano meter wavelength radiation from typical HeNe lasers, course measurement resolution of $\pm 3 \times 10^{-7}$ meter, and fine measurement resolution of $\pm 1 \times 10^{-8}$ meter are possible. Further, using other techniques, such as orthogonal polarization phase shift doubling (today, an entirely conventional practice, which is not particularly germane to the following discussion), even these resolutions can theoretically be bettered. Unfortunately, theory and practice often differ by orders of magnitude, and laser displacement interferometry today is very much an example of this.

As interferometry has matured the following terms have come into general use. Resolution is the minimum detectable displacement of a target. Dynamic range is the ratio of measurement range to resolution. And, precision is the resolution relative to the physical size of the instrument. Basic interferometry in manufacturing environments today is capable of dynamic ranges of $1 \times 10^{-5}$ (e.g., resolution of $3 \times 10^{-6}$ meters across the diameter of a 300 mm semiconductor wafer). With environment control, dynamic range can be extended to $1 \times 10^{-7}$. And, with environmental compensation the inventors are able to obtain dynamic range approaching $1 \times 10^{-8}$.

Two sources of error in laser displacement interferometry are common. First, the constant factors of wavelength and index of refraction are never absolutely constant. Second, the instrumentation which is used has resolution limits of its own. Today, light wavelength concerns are usually addressed by improvement in the frequency stability and the repeatability of the laser radiation sources used. And, while quite important in interferometry, this class of errors is not of concern here. Similarly, general instrumentation design is not of concern here, being merely an exercise in engineering. Neither of these error sources will be discussed further herein.

The present interest is errors caused by changes in the index of refraction of the materials through which laser interferometer radiation travels. For purposes of this discussion these refractive materials can be classified as the general optics of the interferometer, and the air-filled regions which the laser beams travel through on their way to and from retro reflective targets (plural, in some implementations, since the reference beam reflector is also really a target, and may have either an optical glass or an air path to it as well). The refractive indexes of the general optics can be made relatively stable, can be measured, and can be compensated for with relative ease. Unfortunately, both determining and controlling the index of refraction of air are not such easy tasks.

The refractive index of air is a function of pressure, temperature, humidity, and gas composition (dealt with by most writers as merely $CO_2$ concentration). (See generally, Bobroff, Recent Advances in Displacement Measuring Interferometry, Meas. Sci. Technol. 4 at 907–26 (1993); and Estler, High-accuracy Displacement Interferometry in Air, Applied Optics Vol. 24, No. 6 (Mar. 15, 1985).) Most text book discussions deal with these variables as static influences on the index of refraction. Unfortunately, as reference to any weather report will illustrate, air is not necessarily static nor suitable for study as merely a combination of four static variables. Each of these factors, individually and in combination, may further vary considerably across distance and time (i.e., vary dynamically). And, experience is showing that even in very small manufacturing environments, such dynamic effects on the refractive index of air can appreciably affect interferometric measurement accuracy and repeatability. (Estler at 809–12 extensively discusses amounts of change in refractive index due to atmosphere dynamics, as well as the equations today felt to govern such change.)

As somewhat alluded to previously, two approaches can be taken, individually or in combination, to reduce errors caused by changes in the refractive index of air. First, the characteristics of the air may be controlled. Unfortunately, this can be difficult, e.g., maintaining constant pressure as a storm front moves through; or, even counter-productive, e.g., slowing production equipment to reduce turbulence as 300 mm semiconductor wafers are moved in a chip fabrication process. Further, since movement of tools and work pieces is inherent in most manufacturing process, environmental control often has manufacturing process imposed limits in addition to inevitable environmental engineering limits. However, aside from noting that the inventor's techniques are also quite suitable for application to study atmospheric conditions when refining control techniques, control techniques will not be discussed further here. The primary concern here is the second approach, performing correction of measurements for environmental changes, an approach which the profession has come to term "compensation."

Compensation, in the present context of manufacturing metrology, is a relatively new and evolving science. For example, while empirical equations for pressure and temperature related compensation have been derived and are today considered well correlated, gas composition is rarely considered (and then, as noted, usually only in relation to $CO_2$ concentration). Of particular current interest is humidity, because until quite recently measurement accuracy for relative humidity in non-laboratory conditions was typically only 5–10% (however, 1% and better accuracy is now becoming obtainable in automated systems). Further, due to the empirical nature of the equations used for compensation, there has been considerable ongoing refinement of these equations, particularly regarding humidity. The net result of this has been that, outside of research and academic laboratories, humidity has until now been largely neglected as a measurable factor, and thus also as a controllable, and compensate able one. However, driven by the need for even higher precision in measurements, to accomplish even greater product capability and reliability, humidity is now drawing serious attention.

As noted previously, the study of air index of refraction has static and dynamic aspects. Compensation is proving to be an art which can be refined considerably by applying this fact. The characteristics of air that determine its refractive index are not necessarily static, across both distance and time these characteristics can be quite dynamic. For example, it has already been noted that pressure is time dynamic as storm fronts pass. And, similarly, temperature may be highly location dependant, surface infrared emission effects being one example, and air stratification effects another (see e.g., Estler at 810, discussing the use of multiple averaged temperature sensors for compensation of the later). Further, even human presence in the manufacturing environment can affect the refractive index of air. Bobroff, at 916, discusses human contributions to $CO_2$ concentration. And, obviously, human breath has a considerable localized humidity affecting potential. In many manufacturing scenarios all of these above example influences can, to some extent, be addressed with either control, compensation, or both.

Unfortunately, some manufacturing scenarios are not easily subject to rigorous environmental control. For example, as also previously noted, due to wafer movement during semiconductor manufacturing the characteristics of the surrounding air can be dynamic. Further, the inventors have observed that merely changing the axis of measurement may appreciably change the refractive index encountered. Further, air dynamics may even be a desired part of the manufacturing process. For example, laminar air streams are deliberately created and used in some clean room environments to flush potential contaminants away from critical manufacturing process regions. Unfortunately, most compensation today utterly fails to take such air dynamics into account, and compensating systems, with limited exceptions, are little more than home weather units hung on a convenient wall and electronically patched and software kludged into the interferometer or process electronics.

Another area of needed compensation improvement can be termed usability improvement. For example, merely measuring humidity, pressure, and temperature with sensors alone does not accomplish compensation. Some form of calculation must be made based on the sensor measurements, and then used to correct the laser interferometer displacement measurements. This can be done either by a human or automatically, preferably at the measurement stage (i.e., in the interferometer system), but if necessary within the process controls. However, this later method forces multiple tasks upon the process controls, typically requiring the steps of acquiring sets of inputs from the sensors and the interferometer, interpreting them, combining to calculate a true displacement, and then passing on the result; with the displacement being the only value actually germane to the manufacturing process. Unfortunately, to date, automatic compensation techniques have required users to themselves combine laser interferometers, atmospheric sensor equipment, and their respective manufacturing process—at least three separate sub-systems. For users this has proven to be awkward and error prone. Thus, a key observation of the inventors is that users want a single integrated measurement solution, to add to their individualized manufacturing processes. Another key point is that users want a measurement solution that integrates well with their manufacturing processes. To date, typified by general origins as weather forecasting equipment, atmospheric sensors have been large awkward discrete sensors and systems. And it follows that they have been more suited to studying large volumes of air, rather than localized points in the manufacturing processes of small products.

DISCLOSURE OF INVENTION

Accordingly, it is an object of the present invention to provide a compensation system which improves laser interferometer measurement accuracy and repeatability.

Another object of the invention is to integrate well with laser interferometers.

Another object of the invention is to provide compensation techniques to facilitate highly localized laser interferometer measurement taking.

And, another object of the invention is to provide compensation techniques which supplant environment control techniques in manufacturing processes which use laser interferometry.

Briefly, one preferred embodiment of the present invention is an atmospheric metrology device containing at least pressure, temperature, and humidity sensors along with a communications port and a control system. The sensors are arranged in close proximity and under direction of the control system collect environmental measurements characterizing a small localized atmospheric region. The control system then directs the measurements transmittal via the communications port to a manufacturing system utilizing the metrology device.

A second preferred embodiment of the present invention is a method of reducing error in laser interferometer measurements used in manufacturing processes. An interferometer measurement and a set of environmental measurements are taken, preferably contemporaneously. The environmental measurements include pressure, temperature, and humidity, and are all taken from directly within the measurement region of the interferometer. A refractive index, reflecting what the interferometer measurement beam encountered, is then calculated and used to accordingly compensate the interferometer measurement, which is then transmitted on to the manufacturing process.

An advantage of the present invention is that it makes more accurate compensation possible, and accordingly more accurate laser interferometric displacement measurements are made possible. Accuracy is enhanced by the addition of humidity as a factor which is measured and entered into the compensation calculations. Accuracy is further enhanced by detection of environmental characteristics, either very close to, or else actually at the point of laser interferometer measurement, by virtue of the small size of the sensors as well as integration of the sensors into a single unit. Accuracy may be further enhanced by the use of multiple such sensor units, to characterize environmental conditions at multiple locations (e.g., at multiple points along a single path or along multiple axis's), and to then by the use of averaging or suitably weighting to calculate compensation more representative of entire interferometer beam paths.

A further advantage of the invention is that the increased accuracy of compensation which it permits leads to more repeatedly accurate laser interferometer displacement measurements.

Still another advantage of the invention is that it may be implemented in very small size, thus permitting very localized laser interferometer displacement measurements.

Yet another advantage of the invention, since it may be used to monitor a localized region, is that multiple such localized regions may be easily monitored with multiple instances of the invention. This monitoring may be either at key points only, or at set incrementally separated points, to permit characterization of a macro environment by analysis of and compensation based upon a number of micro environments.

And, another advantage of the invention is that it permits integrated laser interferometer measurement, providing measurement and compensation to occur outside of the system utilizing the invention. In this manner, the utilizing system can be provided with one compensated interferometer measurement, rather than an uncompensated measurement, environmental data, and the project of combining the two to obtain meaningful compensation. This eliminates processing burden on systems utilizing the invention, as well as set-up complexity and potential error.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description conjunction with the appended drawings in which.

BEST MODE FOR CARRYING OUT THE INVENTION

Figure 1:
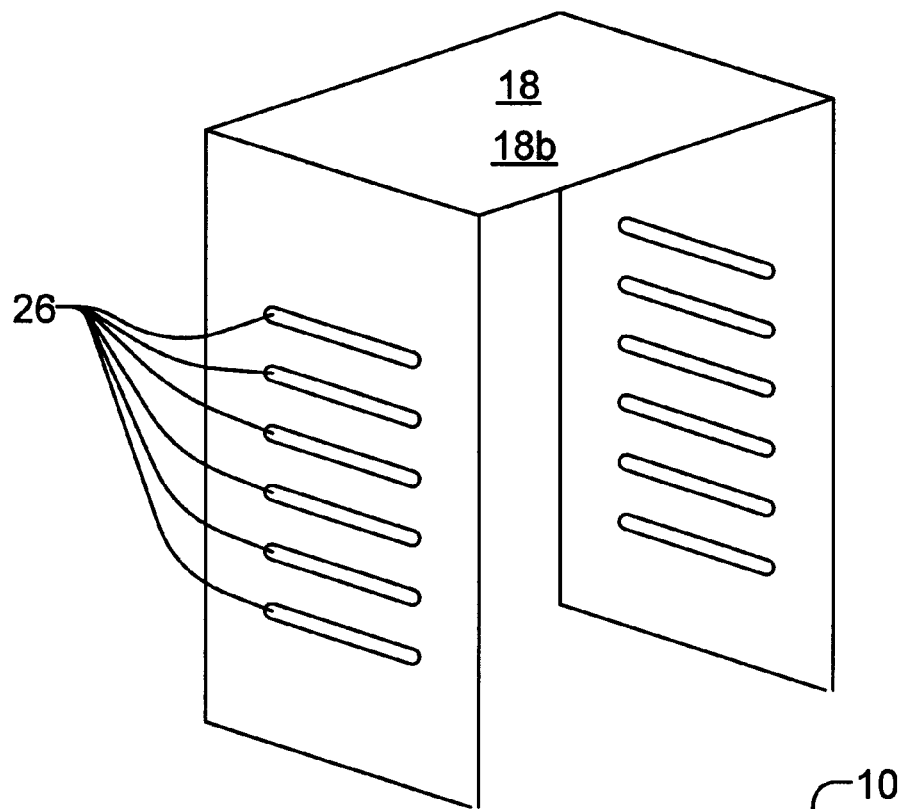
FIG. 1 depicts the inventive device, with interior components visible.
Figure 1:
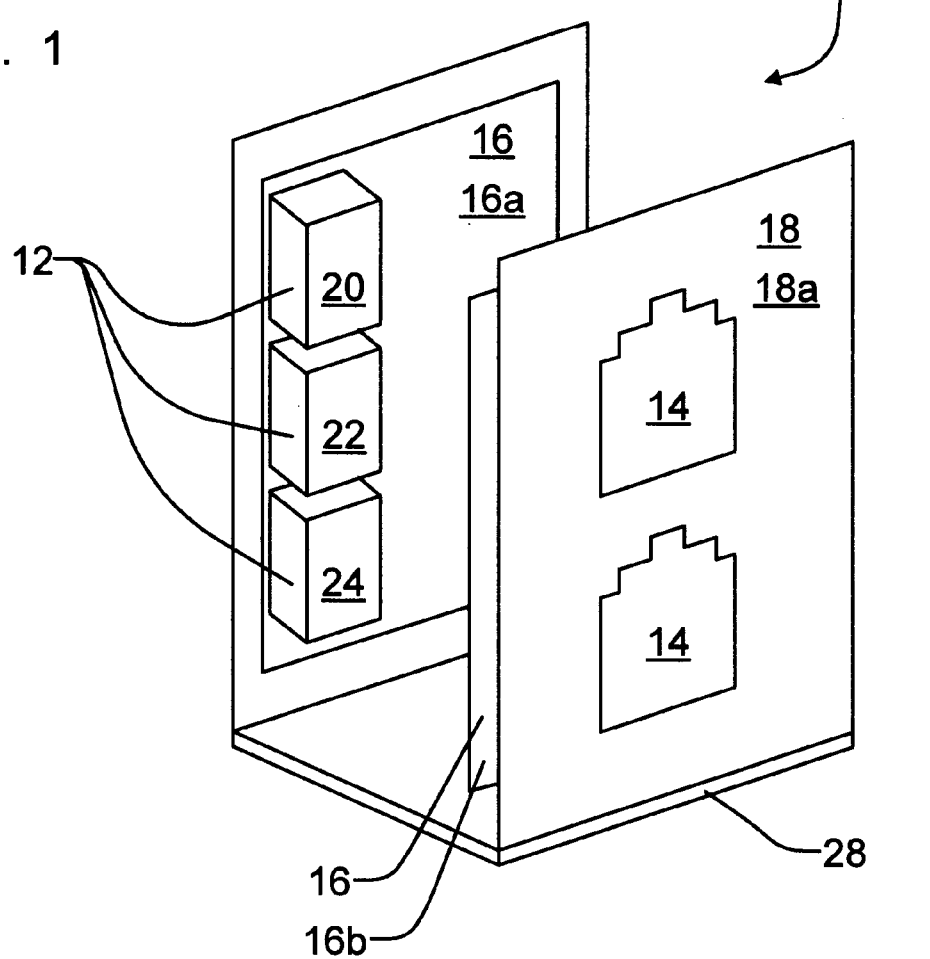

One preferred embodiment of the present invention is a pressure-temperature-humidity metrology device. As illustrated in the various drawings herein, and particularly in the view of FIG. 1, a basic form of this preferred embodiment of the inventive device is depicted by the general reference character 10.

FIG. 1 illustrates the major component elements of the inventive device 10. These include: sensors 12, signal ports 14, control circuitry 16, and a housing 18. The sensors 12 include a pressure sensor 20, a temperature sensor 22, and a humidity sensor 24. For conventional manufacturing convenience, the housing 18 embodiment here comprises a first housing piece 18a and a second housing piece 18b (shown removed in FIG. 1, to facilitate depiction of the internal components).

In the current preferred embodiment of the invention 10, the pressure sensor 20 is a model 27 electronic pressure transducer made by Foxboro, Inc., of San Jose, Calif. Although the figure shows separate components, the temperature sensor 22 and the humidity sensor 24 in the preferred embodiment are a combined model IH-3602-C made by Hy Cal Engineering of El Monte, Calif. The sensors 12 and the signal ports 14 are controlled by the control circuitry 16, a model SC803 signal converter from Enviro-Systems, Inc., of Thousand Oaks, Calif. In the inventor's preferred embodiment pressure is sensed across the range of 16 to 32 inches of mercury with accuracy of 0.06 inches and resolution of 0.0032 inches (respectively, approximately 406 to 813 mm of Hg, 1.5 mm, and 0.08 mm); temperature is sensed across 15 to 35 degrees Celsius, accurate to 0.05 degree, and with 0.01 degree resolution; and, relative humidity is sensed across zero to 100%, accurate to ±2%, and with 0.1% resolution.

It should be noted that a key aspect of the present invention is the incorporation of all of the above types of sensors 12 into a single measuring unit, something not previously done in devices of such small size generally, or in the field of interferometry specifically. In the preferred embodiment, the sensors 12 are all within 2 cm of each other, and the entire inventive device 10 measures less than 5×4×4 cm overall. Admittedly, small wall and desktop general metrology stations which measure pressure, temperature, and humidity do exist. However, these lack the accuracy and the communications capability of the present device 10, and the inventors know of no examples of such metrology stations which have sensor separations of less than 15 cm.

There are advantages to close sensor placement beyond mere compactness for its own sake. One of the inventors' key observations is that all types of metrology in dynamic manufacturing scenarios should be sampled as much as possible together at the critical point or points in such processes. To compensate for refractive index changes during interferometric measurement, using such all-types-at-one-point measurement produces more accurate and repeatable results than using different-types-at-different-points measurements. Of course, there may be multiple points (either as associated points effectively defining a critical region, or as discrete critical points in the process), but once the inventive principle here is grasped the answer to these situations becomes use of an all-types-at-each-point approach. It should be noted that the 2 cm sensor 12 separation noted above is merely the closest which present technology realistically permits. In principle the closer the better, but once this principle is appreciated it follows that further apart is still good enough in many less critical measurement scenarios.

To date, industry has failed to appreciate this all-types-at-each approach. While it has long been understood that pressure, temperature, and humidity all in concert affect the refractive index of air, and while it has also long been understood that air has both time and distance dynamics, putting these two bodies of knowledge together and teaching a way to use that combination to improve upon the accuracy and repeatability of interferometric measurement is new. The closest known prior art, is Estler's work described in the previously noted 1985 article, which discusses metrology for interferometric measurement in the manufacturing of telescope optics using a diamond turning machine which has axis's of movement of 1.6 m by 0.5 m.

Estler teaches concurrently compensating for pressure, temperature, and humidity (and even $CO_2$ concentration), but it can be distinguished from the present invention because of its use of discrete metrology devices spread across a beam path of 6 meters. For example, in Estler's FIG. 1 the pressure and humidity sensing devices are not even shown located in the actual measuring region (to the right of the interferometer head), and in Estler's text and FIG. 2 the respective discrete metrology devices are discussed as and shown positioned across the 6 meter beam path. For temperature sensing Estler teaches spacing thermisters 8–10 cm apart in an array across the entire 6 m beam path and then averaging the results (Estler also noted that bi-directional repeatability was reduced by air turbulence, but merely suggested increasing the number of samples). However, this averaged blunt multiple-sample approach is also quite distinct (in fact contrary) from the present teaching that air metrology should be taken, or at least appropriately weighted, with regard to the critical region or regions for the particular air micro dynamics present. For example, in Estler the critical region for measurement was clearly less than 1.6 m (the largest axis of movement of its turning machine), and actually was probably much smaller (we are not told the actual diamond tool size). However, despite this, the temperature was measured across the full 6 meter beam path and averaged. Thus, readings from at least 5.4 meters of relatively stable non-critical beam path were averaged with, and allowed to skew, readings from the other 1.6 meters (notably, Estler observed that human visitor presence near the beam path did skew the temperature array measurements).

The preceding should not be read as denigrating the importance of Estler, this prior art did bring new accuracy and repeatability to the art of interferometry. However, because it is so distinct in its approach, the present invention now provides an order of magnitude improvement in possible resolution in displacement interferometry, particularly when it is used in measurement scenarios where the air characteristics are by choice or necessity dynamic.

Electronically, the control circuitry 16 is connected to the sensors 12 and the signal ports 14. The control circuitry 16 collects information from the sensors 12, suitably tailors that information, and transmits it out of the inventive device 10 via the signal ports 14. In the current embodiment the inventors have chosen to use the RS-485 communications protocol for the signal ports 14. This protocol permits "daisy chaining" of multiple devices into a network arrangement. In the embodiment in FIG. 1 two physical signal ports 14 are provided, for electrical connection of the inventive device 10 to two other points. Those points may include the control system of equipment using the invention (i.e., a "receiving equipment"; e.g., a laser interferometer system) or other RS-485 compliant equipment (i.e., other "transmitting equipment"; e.g., another instance of the invention, or other equipment entirely). However, it should be appreciated that nothing requires that both signal ports 14 of this RS-485 implementation be used. For example, with suitable receiving equipment, multiple instances of the invention can be configured in a "star" network, using only one signal port 14 each. Further, other communications protocols are acceptable as well (e.g., RS-232). Thus, the communication protocol used and the number (one, two, or more) of signal ports 14 which are provided, or used, are not critical, and accordingly are not limiting on the scope of the inventive device 10.

Operating power for the embodiment portrayed in FIG. 1 is also obtained off of the RS-485 signal ports 14. This feature has obvious advantages, such as reducing components and simplifying set-up of systems using the invention. However, again, this is optional, and alternate embodiments of the invention may incorporate a separate power port.

Physically, the control circuitry 16 will typically include at least one printed circuit board, with FIG. 1 depicting two (a first circuit board 16a, handling the sensors 12, and a second circuit board 16b, handling the signal ports 14). The sensors 12 and the signal ports 14 may be mounted on the printed circuit boards 16a and 16b, which are in turn supported by the physically strong housing 18, or they may be directly attached to the housing 18. This is merely a design decision. The signal ports 14 are here mounted in the housing 18 to transfer the attendant stresses of signal cable connection to the structurally robust housing 18. Similarly, the sensors 12 are here mounted on the printed circuit boards, along with the control circuitry 16, to thereby best shield and cushion them within the housing 18 from outside stresses and potential abuse attendant with manufacturing processes in which the inventive device 10 may be employed. Air access slots 26 are provided in the present embodiment, in the second housing piece 18b, for access to the environment which the inventive device 10 is measuring. A further advantage of using multiple printed circuit boards for the control circuitry 16 is reduction of electronic interference. Commonly referred to as "crosstalk," this is the undesirable effect when electrical signals in one part of a circuit affect other parts. In this application, when utmost accuracy of measurement is sought, it may be advantageous to electronically isolate the sensors 12 and the signal ports 14 by selectively placing them on different printed circuit boards 16a and 16b.

Finally, FIG. 1 depicts the inventive device 10 including an optional attachment feature 28, for attaching to a surface close to where measurement is desired. This is consistent with the intended roles of the inventive device 10 to perform highly localized environmental metrology and to permit integration of multiple localized environmental metrology. In FIG. 1 the attachment feature 28 is simplistically depicted in general form to emphasize that it may be implemented in many forms. For example, the inventors currently use a magnet glued to the first housing piece 18a as the attachment feature 28. However, it should be appreciated that suction cups, hook-and-loop type pads (e.g., materials sold under the VELCRO trademark), or any other suitable attachment means can be incorporated into the inventive device 10 to permit securing it to a surface. Further, since the attachment feature 28 is optional, it may be omitted entirely from some embodiments (e.g., if the application surface provides an attachment means, or if the invention is to be glued or screwed into place).

Figure 2:
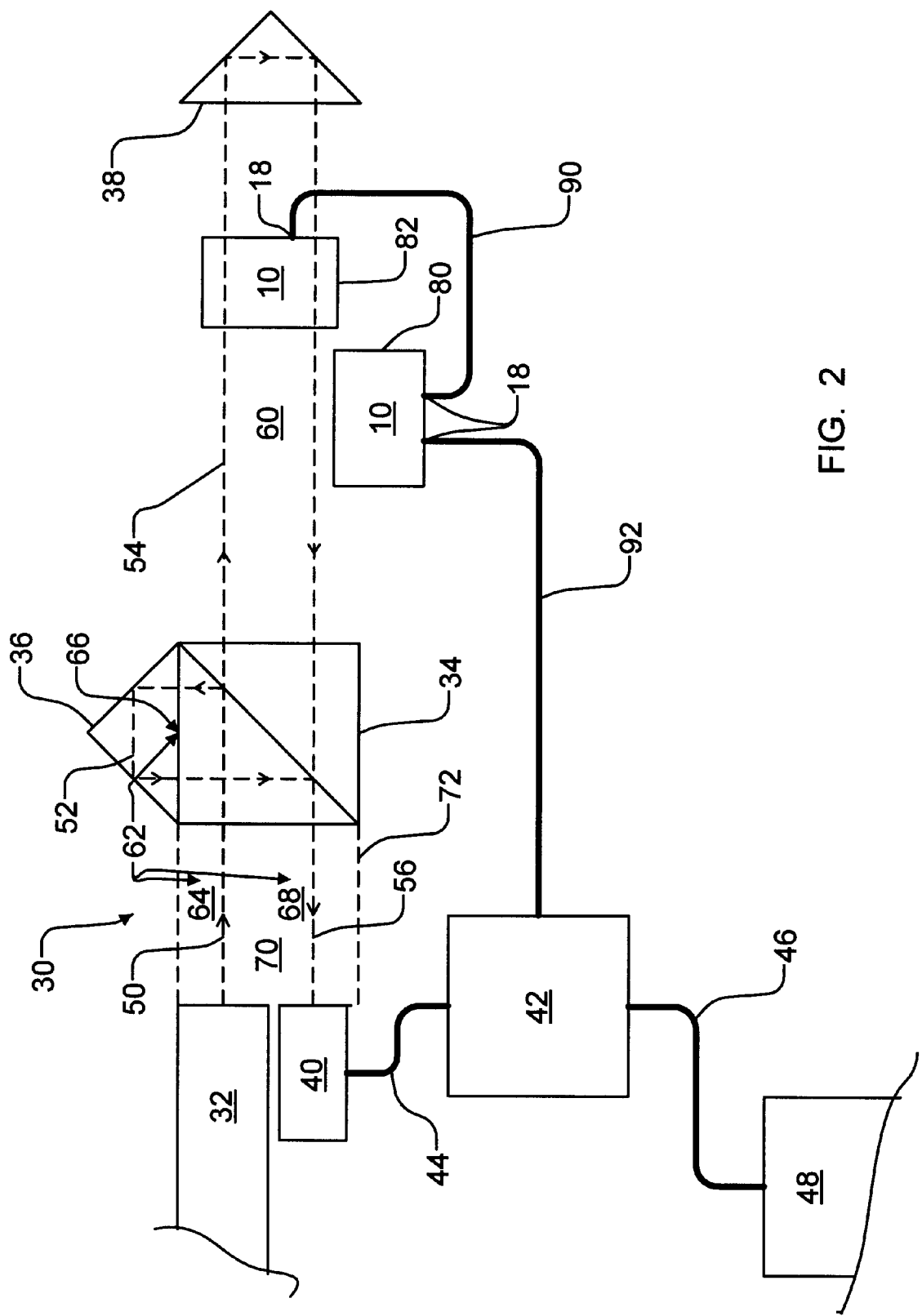
FIG. 2 depicts multiple instances of the inventive device in application.

FIG. 2 illustrates a typical application using the inventive device 10. A laser interferometer 30 is provided having: a laser source 32, a beamsplitter 34, a reference target 36, a measurement target 38, a photo diode receiver 40, and interferometer controller 42. The photo diode receiver 40 is connected to the interferometer controller 42 by a receiver link 44 (shown in FIG. 2 as a separate component, since many interferometers separate the receiving and controlling means). Via a process link 46, the interferometer controller 42 is connected to manufacturing process controls 48. Overall control is provided by the of manufacturing process controls 48, which direct the interferometer controller 42 to perform displacement measurements.

As will be readily apparent to those skilled in displacement interferometry, FIG. 2 does not show all of the components and their separations in correct proportion. For example, to facilitate showing the beam paths, the optical components (e.g., the beamsplitter 34, reference target 36, and measurement target 38) are shown somewhat larger. Further, to fit FIG. 2 onto a single page, the separation between the optical components (e.g., the beamsplitter 34 and the measurement target 38) have been made closer than might be typical in some uses. Still further, the measurement target 38 is not shown actually in the measuring region 60 itself which might often be the case (i.e., literally where the reference character "60" appears in the figure). This avoids potentially confusing overlap of some components in FIG. 2, yet still correctly depicts many manufacturing scenarios where the measurement target 38 is not placed precisely at a critical point or in a critical region but rather at some more convenient mounting point (i.e., while the measurement beam does pass through a critical dynamic environment, the measurement target 38 may be placed beyond this, as shown).

During measurement, the laser interferometer 30 provides a source beam 50, which travels to the beamsplitter 34 and is split into a reference beam 52 and a measurement beam 54. The reference beam 52 travels on to the reference target 36, where it is reflected back into the beamsplitter 34. In FIG. 2 all of the beam paths are indicated by dotted lines, with mid-line arrows pointing in the beam direction. In this portrayal, the beamsplitter 34 and the reference target 36 are adjacent, a typical practice. The measurement beam 54 travels from the beamsplitter 34 on to the measurement target 38, where it is reflected back to the beamsplitter 34. In all interferometers there will be some degree of physical separation of the beamsplitter and the measurement target, since the whole point of interferometry is to measure changes in the region between these components. At the beamsplitter 34 the reference beam 52 and the measurement beam 54 combine to form a recombined beam 56, which travels on to and is detected at the photo diode receiver 40.

The region between the beamsplitter 34 and the measurement target 38 will be termed here the measurement region 60, this is the primary area of interest for application of the inventive device 10. Three general secondary regions 62 of importance also deserve attention: the region between the laser source 32 and the beamsplitter 34 can be labeled the source region 64; the region between the beamsplitter 34 and the reference target 36 can be labeled the reference region 66; and, the region between the beamsplitter 34 and the photo diode receiver 40 can be labeled the receiver region 68. As previously implied, the reference region 66 in this implementation is minuscule or non-existent (being merely a theoretical point in optical glass, or else a very thin region of optical cement holding the reference target 36 and the beamsplitter 34 together). However, it should be noted that this may not always be the case, some interferometers have these components physically separate. Further, in this implementation, the source region 64 and the receiver region 68 are virtually identical, and will therefore be discussed collectively as the return region 70. However, this also may not always be the case.

While the secondary regions 62 will not be discussed extensively here, it should be stressed that changes in refractive indexes there can also severely affect the overall accuracy of interferometer systems.

In both the measurement region 60 and the secondary regions 62 two approaches to minnimization of error can be taken: control of the environment, and compensation for the environmental effect on the refractive index. Since the secondary regions 62 are engineered by the interferometer designer, the usual approach to minimizing error introduction there is control. For example, FIG. 2 shows the return region 70 enclosed by a guard housing 72 (shown in ghost form in FIG. 2). However, not all laser interferometers will be suitable for strong environmental control in the secondary regions 62, and there is always a limit to how strictly any control can be maintained. Thus it should be kept in mind that while the inventive device 10 is discussed here in an application to accomplish compensation for environmental parameters in the measurement region 60, it is quite useful for providing compensation in the secondary regions 62 as well.

In the measurement region 60, FIG. 2 depicts application of two instances of the inventive device 10: an X-axis measuring instance 80, and a Y-axis measuring instance 82. It has been the inventor's experience that accurate characterization of the refractive index of air as it affects measurements of displacement in horizontal planes often requires consideration of both X and Y axis environment components. This depiction also illustrates the versatility of "daisy-chaining" the signal ports 14 of one instance of the inventive device 10 (e.g., the Y-axis measuring instance 82 here) to another instance (e.g., the X-axis measuring instance 80 here) with a first cable 90, with that instance in turn connected with a second cable 92 to the interferometer controller 42.

Two extensions of such multiple instance usage of the inventive device 10 are also possible, and once pointed out will be clear to those skilled in the art. For simplicity, a three dimensional compensation system is not depicted in the figures here. However, it should be clear that such would merely be an extension into three dimensions (i.e., X, Y, and Z) of what is depicted and discussed here for two dimensions (i.e., X and Y). Further, for situations where the measurement region is large, in any individual or combination of dimensions, or where averaging or weighting of multiple measurements will provide better compensation (i.e., where there are critical points or sub-regions within the overall measurement region), it should also now be clear that multiple instances of the inventive device 10 may be placed at multiple locations along each of the dimensions of the measurement region 60.

Another preferred embodiment of the present invention is a method of reducing laser interferometer measurement error. As illustrated in the various drawings herein, and particularly in the view of FIG. 3, a basic form of this preferred embodiment of the inventive method is depicted by the general reference character 100.

Figure 3:
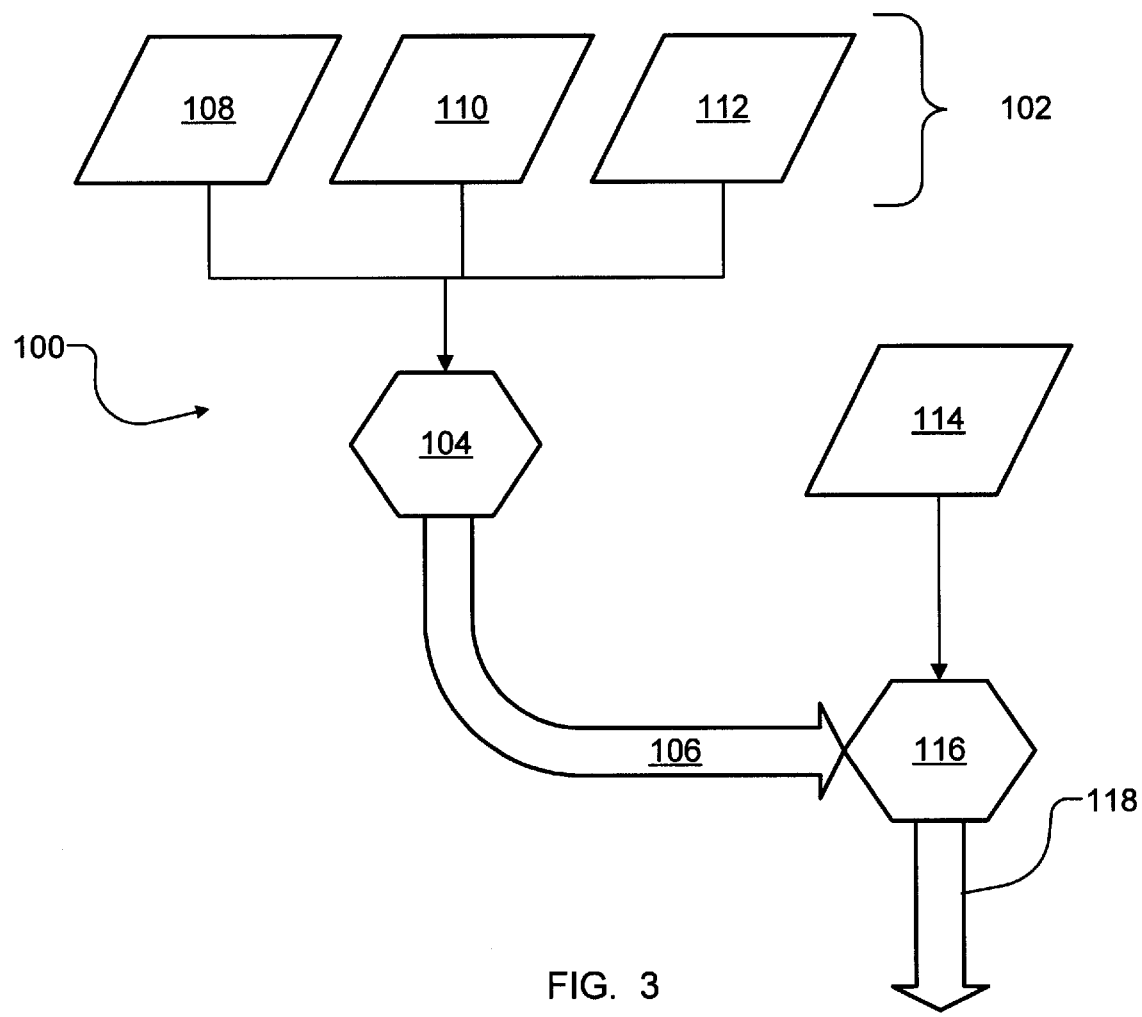
FIG. 3 is a flow chart depicting the inventive method.

FIG. 3 illustrates in flow chart format the major steps of the inventive method 100. These include environment measurement steps 102, environment calculation step 104, and an environment communications step 106. The environment measurement steps 102 include a pressure measuring step 108 a temperature measuring step 110, a humidity measuring step 112, and possible others (e.g., a $CO_2$ gas concentration measuring step). As discussed previously regarding the inventive device 10, the environment measurement steps 102 should be carried out as closely together as reasonable, e.g., at least within 15 cm, and preferably within 2 cm, or even closer if the available sensor components permit.

The environment calculation step 104 takes the individual results of the environment measuring steps 102 and calculates an index of refraction environmental correction factor applicable to the immediate region where steps 102 occurred. It should be appreciated that the relative order of performing the individual environment measurement steps 102 is unimportant. However, of course, steps 102 must be completed prior to step 104 beginning, and step 104 must complete before step 106 begins.

A displacement measurement step 114 is performed, wherein a laser interferometer displacement measurement is taken in the immediate region where steps 102 occurred. The results of the environment calculating step 104 are then applied to those of the displacement measurement step 114 in a displacement compensation step 116, to obtain a compensated displacement value which more accurately portrays actual displacement of the interferometer target. Ultimately a displacement communication step 118 occurs, wherein that value for actual displacement is communicated to a human user via a display or, more commonly, directly into the control system of a manufacturing process employing the interferometric measurement (e.g., the manufacturing process controls 48 of FIG. 2).

As implied above, whether the environment measurement steps 102 occur before, after, or contemporaneous with the displacement measurement step 114 is optional. However, since air has time dynamic characteristics, it follows that contemporaneous performance of steps 102 and step 114 produce the most accurate results from the inventive method 100. Although seemingly obvious, this is one key point where the inventor's method 100 departs from prior art laser interferometer compensation methods. The inventor's method 100 integrates directly into the interferometer measurement process itself, and compensation can even occur before any measurements are provided to the manufacturing process. For example, one past practice has been to record environmental measurements and interferometer measurements separately, and then combine them in the manufacturing process controls. In such scenarios, where no direct interferometer-environment metrology exists, or even worse when human interaction is involved, compensation is not likely to be sufficiently contemporaneous. In essence, the inventor's method 100 solves the time dynamics problem of air refractive index compensation.

As discussed previously, refractive index also presents another problem, location dynamics. For example, air, which is of primary concern here, often exhibits different indexes of refraction at different locations. Suitable application of the inventor's method 100 can be an appreciable step toward solving the location dynamic problem of air refractive index compensation also.

By choice of a sufficiently integrated and small environmental metrology tool (e.g., the inventive device 10, previously discussed as having the pressure sensor 20, the temperature sensor 22, and the humidity sensor 24 in very close proximity mounted on the same first circuit board 16a) and placing that tool at a measurement point as close as possible to the interferometer measurement beam path (e.g., the measurement region 60 of FIG. 2) the inventive method 100 is a major improvement over prior interferometry compensation systems. One major weakness of compensation systems to date has been their reliance on discrete sensor equipment (i.e., physically separate units such as barometers, thermometers, and hydrometers). Another such weakness has been the physical nature of these discrete pieces of equipment. Such prior art systems have often been constructed, all or in part, using "weather" grade equipment, which is generally far to large too place into the small measurement regions of concern for semiconductor fabrication or disk drive servo track writing, for example. Further, this grade of equipment is primarily constructed to be mounted on vertical surfaces, which makes it awkward to use in the primarily horizontal, planar regions in which many manufacturing processes take place.

The above size and ease of application weaknesses in prior art metrology have lead to under-addressed and even unaddressed areas in environmental metrology in manufacturing scenarios where small regions are critical. In some manufacturing processes today pressure, temperature, and humidity gradients are able to appreciably affect measurement accuracy. Some examples include laminar air flow striations (pressure), work piece surface infra-red radiation of heat from prior manufacturing stages (temperature), and etchant evaporation (humidity). One solution for such "small region problems" is to apply multiple instances of portions of the inventive method 100. By taking multiple instances of measurement steps 102 and then combining all of these in step 104 (averaging or weighting as appropriate) much more representative compensation is possible.

Further, multi-dimensional effects on measurement accuracy may also be addressed in the above manner. It has been the inventor's observation that compensation measurements must be taken as close as possible in the same dimensions as the actual interferometric measurement. For example, when measurement is taken in a laminar air flow stream there is often appreciable difference depending upon whether the measurement equipment is aligned parallel or perpendicular to the flow. Taking into account turbulence introduced by the measurement equipment does not account for all of such measured differences. While the mechanism of such discrepancies are not yet entirely understood, such discrepancies are addressable with suitable equipment and application of the inventive method 100. The inventive method 100 may be applied in a manner appreciative of the dimensions in which the manufacturing process takes place, to most suitably perform environmental metrology in those dimensions. For example, if an essentially linear process occurs along a dimension "X" it would be advantageous to apply the inventive method 100 to perform multiple instances of steps 102 along dimension X, and to average or weigh the compensation calculations in either step 104 or step 116 accordingly. This can be extended to a planar process by performing multiple instances of steps 102 along both the X and Y axis's, and appropriately averaging or weighing the compensation, relative to the respective proportions of the process occurring along each dimension. Finally, of course, this concept can be extended to three dimensions.

In addition to the above mentioned examples, various other modifications and alterations of both the inventive device 10 and the inventive method 100 may be made without departing from the respective inventions. Accordingly, the above disclosure is not to be considered as limiting and the appended claims are to be interpreted as encompassing the entire spirit and scope of the invention.

INDUSTRIAL APPLICABILITY

The present environment metrology device 10 and the environment metrology method 100 are well suited for application in manufacturing of assemblies requiring highly precise and repeatable laser interferometric measurements. By providing more repeatable accurate displacement measurements for existing manufacturing processes the device 10 and method 100 provide additional error "budget," which may be applied to obtain higher product yield. Further, where miniaturization correlates to capacity, the device 10 and method 100 make possible new manufacturing processes for producing higher capacity products. It is therefore anticipated that the inventive device 10 and method 100 will find wide acceptance in industries where measurement accuracy and repeatability are important. As previously noted, examples of such industries include semiconductor fabrication, flat-panel displays, and computer magnetic and optical disk storage media. And while these industries are ones in which immediate benefit is currently desired, and where it is anticipated that the invention will be readily accepted and applied, there are numerous other industries which may also ultimately benefit, since the inventive device 10 and method 100 are highly suitable for all forms and virtually all applications of laser interferometric measurement.

For the above, and other, reasons, it is expected that the environment metrology device 10 and the environment metrology method 100 of the present invention will have widespread industrial applicability, and that the commercial utility of the present invention will be extensive and long lasting.

What is claimed is:

1. An atmospheric metrology device for collecting a set of measurements characterizing a localized environmental region and communicating that set of measurements to a system using the metrology device, comprising:

a pressure sensor, a temperature sensor, and a humidity sensor for creating data for the set of measurements;

communications means for communicating the set of measurements to the measuring system, wherein said communications means includes a plurality of signal ports, to permit networked connection of multiple instances of the metrology device into a network;

suitable housing for arranging said pressure sensor, said temperature sensor, and said humidity sensor in proximity less than 15 centimeters apart; and control means for suitably directing the collection of said data and communicating it via said communications means to the system utilizing the metrology device.

2. The metrology device of claim 1, wherein:

said control means includes at least one circuit board; and said pressure sensor, said temperature sensor, and said humidity sensor are component parts mounted on said circuit board.

3. The metrology device of claim 2, wherein:

said pressure sensor, said temperature sensor, and said humidity sensor are mounted on a first said circuit board; and said communications means is primarily mounted on a second said circuit board, to reduce undesired electronic signals between said communications means and said first circuit board, and to reduce transfer of physical stresses into said first circuit board when a cable is connected to the metrology device.

4. The metrology device of claim 1, wherein:

said control means includes at least one circuit board; and at least two of said pressure sensor, said temperature sensor, and said humidity sensor are integrated as a single component part which is mounted on said circuit board.

5. The metrology device of claim 1, wherein said communications means utilizes a member of the set of communications protocols consisting of RS232, RS422, RS485, and current loop.

6. The metrology device of claim 1, wherein said housing includes attachment means, for mounting the metrology device in a desired location.

7. The metrology device of claim 6 wherein said attachment means is a member of the set consisting of magnets, suction cups, adhesive pads, and hook-and-loop fabric pads.

8. An improved laser interferometer system of the type having a laser source, a beamsplitter, a reference target retro-reflector, a measurement target retro-reflector, a receiver, and an interferometer controller, with the laser source providing a source beam which the beamsplitter splits into a reference beam and a measurement beam, such that the measurement beam passes through a measurement region where interferometric measurement is desired, wherein the improvement comprises:

an environment metrology device having a pressure sensor, a temperature sensor, and a humidity sensor placed in proximity less than 15 centimeters apart, so that said metrology device may be placed directly at the measurement region to obtain environmental measurements;

said metrology device further having communications means, to communicate said environmental measurements to said interferometer controller; and said communications means having networking means, to permit networked connection of multiple instances of said metrology device into a network and communicate individual measurements from each said metrology device to said interferometer controller for suitably averaging, weighing, and calculation of said environmental measurements such that they are representative of the measurement region as a region.

9. The laser interferometer system of claim 8, wherein at least two members of the set consisting of said pressure sensor, said temperature sensor, and said humidity sensor are integrated to form a single component part which is mounted on said circuit board.

10. The laser interferometer system of claim 8 further including a plurality of said metrology devices, wherein said metrology devices are placed generally linearly along an axis of potential movement of the measurement target, to suitably average, weigh, and calculate said environmental measurements such that they are representative of the measurement region relative to said axis.

11. The laser interferometer system of claim 8, wherein said plurality of said metrology devices are placed along a plurality of said axis's of potential movement of the measurement target, to suitably average, weigh, and calculate said environmental measurements such that they are representative of the measurement region relative to said plurality of axis's.

12. A method of reducing error in a laser interferometer based measurement system having a measurement region located between a beamsplitter and a retro-reflective measurement target through which a measurement beam from the laser interferometer travels, the method comprising the steps of:

a) obtaining an interferometric measurement with the laser interferometer;

b) taking a plurality of sets of atmosphere measurements each including parameters for pressure, temperature, and humidity, said parameters in each respective set being taken less than 15 centimeters apart in the measurement region;

c) calculating a refractive index representative of the measurement region based upon said set of atmospheric measurements; and d) compensating said interferometric measurement based upon said refractive index.

13. The method of claim 12, wherein:

step b) occurs along an axis which is generally orthogonal relative to the measurement beam; and step c) includes suitable weighting and averaging said atmospheric measurements such that they are representative of the measurement region relative to said axis.

14. The method of claim 12, wherein:

step b) occurs along a plurality of axis's relative to said measurement beam; and step c) includes suitable weighting and averaging of said atmospheric measurements such that they are representative of the measurement region relative to said plurality of axis's.

15. The method of claim 12, wherein step a) and step b) are performed substantially contemporaneously, to reduce the possibility of change occurring in the measurement region which might affect accuracy of the method.

* * * * *